United States Patent
Ford et al.

(10) Patent No.: US 8,228,195 B2
(45) Date of Patent: Jul. 24, 2012

(54) SYSTEM AND METHOD INCLUDING PARTIAL PRE-PROGRAMMING OF RFID DATA

(75) Inventors: John C. Ford, Boca Raton, FL (US); Christopher Marcus, Simpsonville, SC (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 828 days.

(21) Appl. No.: 11/660,332

(22) PCT Filed: Aug. 22, 2005

(86) PCT No.: PCT/US2005/029801
§ 371 (c)(1),
(2), (4) Date: Feb. 12, 2007

(87) PCT Pub. No.: WO2006/026231
PCT Pub. Date: Mar. 9, 2006

(65) Prior Publication Data
US 2008/0303639 A1    Dec. 11, 2008

Related U.S. Application Data

(60) Provisional application No. 60/604,933, filed on Aug. 27, 2004.

(51) Int. Cl.
| | |
|---|---|
| *G08B 13/14* | (2006.01) |
| *H04Q 5/22* | (2006.01) |
| *G08C 19/12* | (2006.01) |
| *B29C 65/00* | (2006.01) |
| *B65C 9/00* | (2006.01) |
| *B65H 29/54* | (2006.01) |

(52) U.S. Cl. ............... 340/572.1; 340/10.51; 340/13.21; 340/13.26; 156/362; 156/378; 156/566; 271/306

(58) Field of Classification Search ................ 340/10.51
See application file for complete search history.

(56) References Cited

U.S. PATENT DOCUMENTS

| | | | | |
|---|---|---|---|---|
| 5,405,482 | A  * | 4/1995 | Morrissette et al. | 156/364 |
| 6,645,327 | B2 * | 11/2003 | Austin et al. | 156/64 |
| 6,677,852 | B1 * | 1/2004 | Landt | 340/10.1 |
| 6,841,018 | B2 * | 1/2005 | Pituch et al. | 156/64 |
| 7,073,712 | B2 * | 7/2006 | Jusas et al. | 235/451 |
| 2002/0195195 | A1* | 12/2002 | Grabau et al. | 156/300 |
| 2003/0210943 | A1* | 11/2003 | Nedblake et al. | 400/621 |
| 2005/0049979 | A1* | 3/2005 | Collins et al. | 705/75 |

* cited by examiner

*Primary Examiner* — Jennifer Mehmood
*Assistant Examiner* — John Mortell

(57) ABSTRACT

A system and method for partially pre-programming RFID labels. Common data associated with items to which RFID labels are to be applied is pre-programmed into the labels. Item specific data is programmed by a RFID label programmer in the application process.

12 Claims, 2 Drawing Sheets

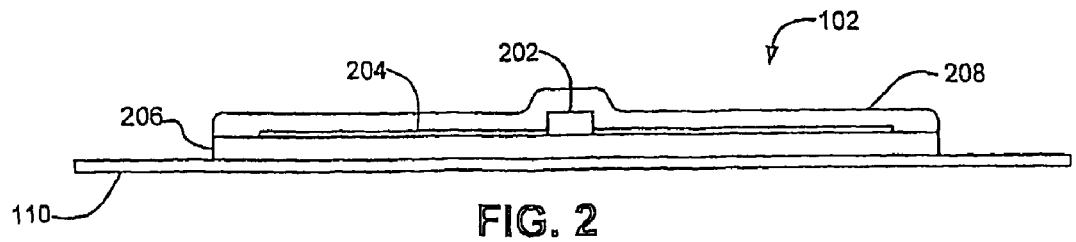
FIG. 2
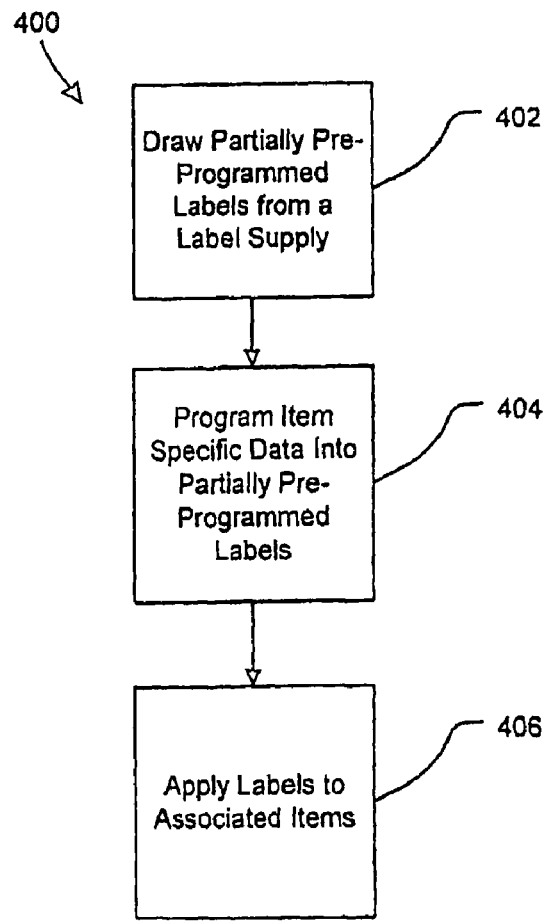
FIG. 3A
FIG. 3B
FIG. 4

SYSTEM AND METHOD INCLUDING PARTIAL PRE-PROGRAMMING OF RFID DATA

TECHNICAL FIELD

The invention relates to radio frequency identification (RFID) label applicators, and more particularly, to a system and method including partial pre-programming of RFID data.

BACKGROUND INFORMATION

Radio frequency identification (RFID) systems are generally known and may be used for a number of applications such as managing inventory, electronic access control, security systems, automatic identification of cars on toll roads, and electronic article surveillance (EAS). RFID devices may be used to track or monitor the location and/or status of articles or items to which the RFID devices are applied. A RFID system typically includes a RFID reader and a RFID device such as a tag or label. The RFID reader may transmit a radio-frequency carrier signal to the RFID device. The RFID device may respond to the carrier signal with a data signal encoded with information stored on the RFID device. RFID devices may store information such as a unique identifier or Electronic Product Code (EPC) associated with an article or item.

RFID devices may be programmed (e.g., with the appropriate EPC) and applied to the article or item that is being tracked or monitored. A RFID reader/programmer may be used to program RFID devices and to detect defective RFID devices. Label applicators have been used to apply programmed RFID labels to items or articles.

In one configuration, an RFID programmer may be integrated into a label applicator. One example of such a system is described in U.S. Provisional Patent Application Ser. No. 60/604,928, filed on Aug. 27, 2004, the teachings of which are incorporated herein by reference. In a system with an integrated RFID programmer, blank RFID labels, i.e. labels having no information programmed thereon, may be provided on a web of material wound around a feed roller. The web may be drawn from the feed roller past an RFID programmer, which programs the labels with information specific to the articles to which they are to be applied.

After each label is programmed, the programmer may read the label to determine whether the label is properly programmed. The label may then be directed by one or more driven and/or idler rollers to the location where the label is removed from the web and applied to an associated item. If a label is determined to be defective upon reading of the label by the RFID programmer, a label reject assembly may be actuated to prevent the label from being applied to an article. Once a label is rejected, it may be necessary to re-write and re-verify the next label on the web to ensure it includes appropriate information for the item to which it is to be applied. This process can be time-consuming, and can significantly limit the operating speed of the integrated system.

SUMMARY OF THE INVENTION

The invention relates to radio frequency identification (RFID) label applicators, and more particularly, to a system and method including partial pre-programming of RFID data. Embodiments of the invention may include a system for affixing an radio frequency identification (RFID) label to an item that includes drawing a partially pre-programmed label from a label supply; programming item-specific data into the partially pre-programmed label to provide an item-specific label; and applying the item-specific label to an associated item.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

FIG. 2 is a side cross-sectional view of one embodiment of a RFID label that can be used in the RFID applicator consistent with one embodiment of the invention.

FIG. 3A diagrammatically illustrates bit values associated with address locations for an exemplary RFID label that has been partially pre-programmed in a manner consistent with the invention.

FIG. 3B diagrammatically illustrates bit values associated with address locations for the exemplary RFID label of FIG. 3A after programming with label-specific information in a manner consistent with the invention.

FIG. 4 is a block flow diagram of one exemplary method of consistent with the invention.

DETAILED DESCRIPTION

Figure 1:
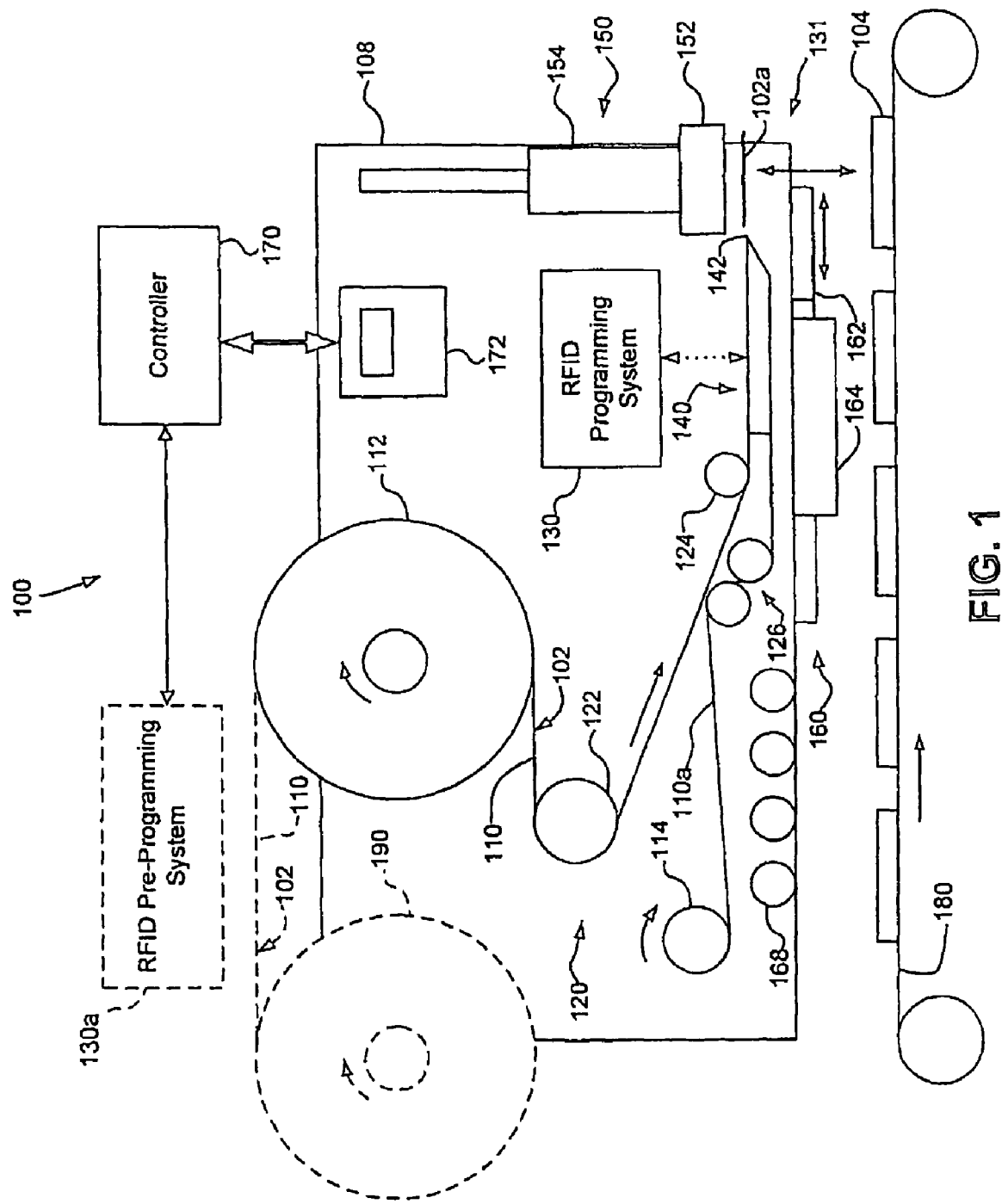
FIG. 1 is a diagrammatic view of a RFID applicator consistent with one embodiment of the invention.

Numerous specific details may be set forth herein to provide a thorough understanding of the embodiments of the disclosure. It will be understood by those skilled in the art, however, that various embodiments of the disclosure may be practiced without these specific details. In other instances, well-known methods, procedures, components and circuits have not been described in detail so as not to obscure the various embodiments of the disclosure. It can be appreciated that the specific structural and functional details disclosed herein are representative and do not necessarily limit the scope of the disclosure.

It is worthy to note that any reference in the specification to "one embodiment" or "an embodiment" according to the present disclosure means that a particular feature, structure, or characteristic described in connection with the embodiment is included in at least one embodiment. The appearances of the phrase "in one embodiment" in various places in the specification are not necessarily all referring to the same embodiment.

Typically, much of the information programmed into an RFID label may be common data known prior to the time the labels are drawn from a label supply for application. For example, product information for the products to which the labels are to be applied is typically known prior to application of the labels. Consistent with the invention, therefore, the operating/line speed of an RFID label applicator with an integrated programmer may be improved by partially pre-programming the RFID labels with common data before they are drawn from a label supply. When the partially pre-programmed labels are drawn from the label supply into an applicator, an RFID programming station may program the unprogrammed bit locations with, for example, information related to the specific product to which the label is to be applied.

Partially pre-programming the labels consistent with the invention may reduce the write time for an integrated RFID programmer by 50%, excluding processing time associated with the additional software required to locate the start location of the bits to be programmed by the integrated programmer. In addition, defective labels may be identified during the pre-programming process, e.g. by reading the pre-programmed label to determine if the pre-programmed bits and null values in unprogrammed address locations have been properly programmed. If a label is defective, the label may be identified as defective so that it is not programmed or applied to a product by the applicator. The read verification process of the integrated RFID programmer may then be omitted, or limited to only to the bits programmed during application.

Referring to FIG. 1, a radio frequency identification (RFID) label applicator 100 consistent with embodiments of the invention may include a web feeding mechanism 120 to feed a liner or web 110 of material carrying a plurality of RFID labels 102 through the applicator, an optional RFID pre-programming system 130a to partially pre-program the RFID labels 102, an integrated RFID programming system 130 to program unprogrammed bits on the RFID labels 102, an applicator system 131 for applying labels to associated items, and a rewind roll to receive scrap web 110a after the labels are applied or rejected. The applicator system 131 generally includes a peeler member 140 to peel the programmed RFID labels 102 from the web 110, a label tamp assembly 150 to apply the RFID labels 102 to the items 104, and a label reject assembly 160 to reject RFID labels. The RFID label applicator 100 may also include an applicator controller 170 to control operation of the RFID label applicator 100. Components in the applicator 100 may be mounted or secured to an applicator frame 108.

The RFID label applicator 100 may also include other components not shown in FIG. 1. Examples of additional components include, but are not limited to, a label sensor to sense and position the labels 102 relative to the RFID programming system 130, an item sensor to sense and position the items 104 relative to the tamp assembly 150, and an integrated printer to print indicia on the labels 102. One example of a label sensor includes a thru-beam that shines a light from beneath the web to a light sensor 110 positioned above the web 110.

The RFID labels 102 may be removably secured to the web 110 such that the RFID labels 102 are supported on the web 110 during programming by the RFID programming system 130, and may be removed (e.g., peeled away from the web 110) for application to the articles or items 104. The articles or items 104 may be arranged in a line (e.g., a product line) and may be moved in synchronization with the applicator, for example, using a conveyor 180 or other similar mechanism. The articles or items 104 may be products, merchandise, or any other items or articles that may be monitored using RFID techniques.

In one embodiment consistent with the invention, the labels 102 may be partially pre-programmed by the RFID pre-programming system 130a as they are wound onto the supply roll 112, e.g. from a blank label supply roll 190. The RFID pre-programming system 130a may be placed adjacent the web 110 being drawn or supplied from the blank label supply roll to the supply roll 112 for partially pre-programming the labels, either serially or in groups, as they pass by the system 130a onto the supply roll 112. The RFID pre-programming system 130a may include a RFID reader/programmer coupled to one or more RFID programming antennas. The RFID pre-programming system 130a may, for example, include any RFID reader/programmer known to those of ordinary skill in the art for reading and/or programming RFID devices, such as the type known as the Sensormatic® SensorID™ Agile 2 Reader available from Tyco Fire and Security.

The RFID pre-programming system 130a may be configured to detect defective RFID labels, for example, by attempting to read a RFID label after applying programming signals to pre-program common data into the label. If a pre-programmed label cannot be read by the pre-programming system 130a, the label may be deemed defective. A defective label may be identified to prevent writing of the label by the RFID programming system 130. In one embodiment, for example, the RFID pre-programming system may be coupled to the system controller 170, and may provide a signal to the system controller indicating the location of the defective label on the web 110. The system controller may prevent the RFID programming system 130 from attempting to program or read the defective label.

In another embodiment, the labels 102 may be partially pre-programmed with common data at a remote or separate location before they are provided on the roll 112. Defective labels may also be removed from the supply roll. The labels may be affixed to a web 110, either before or after pre-programming, and may be stored in rolls until the system 100 is to be operated for application of the labels to associated products. A roll of pre-program labels may then be provided as the supply roll 112 prior to the web 110 being drawn through the applicator. In such a system, the applicator would not require a dedicated RFID pre-programming system 130a, allowing a single pre-programming system to be used for independently pre-programming labels to be applied to associated items by separate applicators.

Once the pre-programmed labels are provided on the supply roll, the web feeding mechanism 120 may be operated to draw the web 110 past the RFID programming system 130 and to, e.g. a peeler member 140. The web feeding mechanism 120 may include a drive and nip roller assembly 126 that takes up the scrap web 110a and feeds the scrap web 110a to the web rewind roll 114. The drive and nip roller assembly 126 may be driven to pull the scrap web 10a, thereby causing the web 110 with the RFID labels 102 to pass around the peeler member 140. The supply roll 112 and/or rewind roll 114 may also be driven (e.g., with servomotors) to facilitate unwinding of the web 110 and/or rewinding the scrap web 110a.

The RFID programming system 130 may be configured to program the unprogrammed bits of each label on the web with item-specific information as the labels pass by the system 130 to the peeler bar 140. The RFID programming system 130 may include a RFID reader/programmer coupled to one or more RFID programming antennas, and may include any RFID reader/programmer known to those of ordinary skill in the art for reading and/or programming RFID devices. The RFID programming system 130 may also be capable of detecting defective RFID labels, for example, by attempting to read a RFID label after applying programming signals to program the unprogrammed bits.

The peeler member 140 may include a peel tip 142 having a radius and forming an angle such that a RFID label 102 peels away from the web 110 as the web 110 passes around the peel tip 142. In one embodiment, the radius of the peel tip 142 may be in a range of about 0.030 in. and the angle formed by the peel tip 142 may be in a range of about 90° or less. Other radii and angles may be used and may depend upon the adhesion properties (e.g., the adhesion strength) of the RFID labels 102 on the web 110. The peeler member 140 may be made of a rigid material such as aluminum. In one embodiment, the peeler member 140 may be in the form of a plate or a bar, although those skilled in the art will recognize other shapes and configurations.

The label tamp assembly 150 may include a tamp pad 152 coupled to a tamp driving mechanism 154. The tamp pad 152 contacts the non-adhering side of a RFID label 102a that has been removed from the web 110 and holds the RFID label 102a. The tamp driving mechanism 154 drives the tamp pad 152 and the RFID label 102a toward the item 104 to which the RFID label 102a is to be applied. One embodiment of the tamp assembly 150 uses a vacuum pressure to retain the RFID label 102a in contact with the tamp pad 152. The vacuum pressure may be released and/or air may be blown from the tamp pad 152 to facilitate application of the RFID label 102a. Although the exemplary embodiment shows one embodiment of a label tamp assembly 150, the label tamp assembly 150 may include any structure or mechanism for moving a label into contact with an item 104.

The label reject assembly 160 may include an accumulation pad 162 coupled to a label reject driving mechanism 164. Upon determining that a RFID label 102 is to be rejected, the reject driving mechanism 164 drives the accumulation pad 162 into the path of the tamp pad 152. The tamp pad 152 then applies the rejected RFID label to the accumulation pad 162 instead of the item 104. A RFID label may be rejected when the label is determined to be defective or for other reasons. Although the exemplary embodiment shows one embodiment of the label reject assembly 160, the label reject assembly 160 may include any structure for intercepting or otherwise preventing a RFID label from being applied to an item 104.

The tamp driving mechanism 154 and the label reject driving mechanism 164 may include pneumatic actuated air cylinders, such as the type available from PHD, Inc. When air cylinders are used as the driving mechanisms, the RFID label applicator 100 may also include one or more air pressure gauges 168 to monitor and/or adjust operation of the air cylinders, as is known to those skilled in the art. Although the exemplary embodiment uses air cylinders and rods, those skilled in the art will recognize that other linear actuators or driving mechanisms may be used.

The applicator controller 170 may be a programmable logic controller (PLC), such as the type available from Allen-Bradley, Omron or Mitsubishi, or a general purpose computer, such as a PC, programmed to control one or more operations of the applicator 100. The controller 170 may be coupled to the web feeding mechanism 120 (e.g., to the motors, sensors, etc.) to control the feeding of the web 110 around the peeler member 140 and/or to control the positioning of the RFID labels 102 relative to the RFID programming system 130. The controller 170 may also be coupled to the tamp assembly 150 to control application (or tamping) of programmed and removed RFID labels to the items 104. The controller 170 may also be coupled to the label reject assembly 160 to control the rejection of labels, for example, when the label is determined to be defective. The controller 170 may also be coupled to a user interface/control panel 172 to enable a user to monitor the application process and/or to provide commands and/or operating parameters to the controller 170.

The controller 170 and/or user interface 172 may also be coupled to the RFID pre-programming system 130a and the RFID programming system 130 to control the RFID programming operations. RFID programming operations may be controlled, for example, by allocating Electronic Product Codes (EPC's) and/or other data to be sent to the RFID labels 102 upon receiving an indication that the RFID labels 102 are properly positioned relative to the RFID programming system 130. The controller 170 may also monitor the detection of defective labels by the RFD-preprogramming system 130a to control the label reject assembly 160. The controller 170 may further collect programming data and statistics and provide such data to the user.

One embodiment of a RFID label 102 is shown in greater detail in FIG. 2. The RFID label 102 may include an integrated circuit (IC) chip 202 coupled to an antenna 204. The IC chip 202 and antenna 204 may be sandwiched between one or more layers or substrates, such as an adhesive substrate 206 and a printable layer 208. The adhesive substrate 206 may include a scrim coated on each side with an adhesive, such as an acrylic based adhesive. The printable layer 208 may be made of a thermal transfer paper or other material suitable for printing. One or more additional layers or substrates may also be incorporated into the RFID label 102, as is known to those skilled in the art. The web 110 may be made of a paper with a release agent such as wax or silicone to allow the RFID label 102 to peel away from the web 110. The RFID label 102 may have a peel adhesion strength (e.g., about 15 N/inch) that allows the RFID label 102 to be removably adhered to the web 110 and later adhered to the items 104. Although RFID labels may have various sizes, one example of the RFID label 102 may be about 3 in. by 3 in. and supported on a web 110 having a width of about 4 in.

One example of a RFID label 102 is the "Combo EAS/RFID Label or Tag" disclosed in U.S. Provisional Patent Application Ser. No. 60/628,303, which is fully incorporated herein by reference. Other examples include the RFID labels commercially available under the name Sensormatic® from Tyco Fire and Security. Those skilled in the art will recognize that the RFID label 102 may include any RFID device capable of being adhered or otherwise secured to articles or items.

As is known to those of ordinary skill in the art the IC of an RFID label may be configured to include a plurality of programmable bits, e.g. 64 or 96 bits, at associated addresses. FIG. 3A diagrammatically illustrates bit locations and addresses for an exemplary pre-programmed label including 64 programmable bits in 16 address locations (i.e. four programmable bits at each address) that has been pre-programmed in a manner consistent with the invention. As shown, each of the bits at the first eight address locations 300, e.g. addresses 0-7, may be pre-programmed with common data associated with each of a plurality of items to which the label may be applied. In the illustrated embodiment, the bit sequences are identified in hexadecimal form such that the "A" indicated at address "0" represents a bit sequence of 1010 at address "0". Each of the bits at the second eight address locations 302, e.g. addresses 8-15, may be pre-programmed with null values indicated by a blank space in FIG. 3A. In FIG. 3, therefore, half of the address locations are pre-programmed with common data, i.e. the bit sequence identified by the hexadecimal string A852C20D.

As shown in FIG. 3B, for example, prior to application of each labels to an associated item the null values in address locations 8-15 302 may be overwritten by the RFID programming system 130 to program these locations with item-specific data related to the item to which the label is to be applied. In the illustrated embodiment, the item-specific data is represented by the bit sequence identified by the hexadecimal string 1F20CE44. Programming only a portion of the total number of programmable bits at the RFID programming system 130 may save significant processing time compared to programming all bits in a label, and thus improves the operating speed of the applicator 100. The RFID programming system 130 may be configured to verify proper programming of only the bit locations it programs, or may completely omit a verification step, to save additional processing time.

FIG. 4 is a block flow diagram of a method 400 consistent with one exemplary embodiment of the invention. The illustrated block flow diagram includes a particular sequence of steps. It can be appreciated, however, that the sequence of steps merely provides an example of how the general functionality described herein can be implemented. Further, each sequence of steps does not have to be executed in the order presented unless otherwise indicated.

In the illustrated exemplary embodiment, partially pre-programmed labels are drawn 402 from a label supply. Item-specific data is then programmed 404 into the partially pre-programmed labels. The labels are then applied 406 to associated items.

It will be appreciated that the functionality described for the embodiments of the invention may be implemented in the video RFID pre-programming system 130a, the RFID programming system 130, the system controller 170 and/or another system component using hardware, software, or a combination of hardware and software, and well-known signal processing techniques. If implemented in software, a processor and machine-readable medium is required. The processor can be any type of processor capable of providing the speed and functionality required by the embodiments of the invention. For example, the processor could be a processor from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further the processor and machine-readable medium may be part of a larger system that may contain various combinations of machine-readable storage devices through various I/O controllers, which are accessible by the processor and which are capable of storing a combination of computer program instructions and data.

There is thus provided, according to one aspect of the invention, a method of affixing an RFID label to an item including: drawing a partially pre-programmed label from a label supply; programming item-specific data into the partially pre-programmed label to provide an item-specific label; and applying the item-specific label to an associated item.

According to another aspect of the invention, there is provided a system for affixing an RFID label to an item. The system includes a label supply including a plurality of RFID labels, each of the labels being partially pre-programmed with common data that is common to each of a plurality of items; a programming unit for receiving one or more of the RFID labels from the label supply, the programming unit configured to program item specific data on the label; and an applicator system for applying the label to an associated item.

According to another aspect of the invention, there is provided an RFID label supply including a plurality of RFID labels. Each of the labels is partially pre-programmed with common data that is common to each of a plurality of items.

While the principles of the invention have been described herein, it is to be understood by those skilled in the art that this description is made only by way of example and not as a limitation as to the scope of the invention. Other embodiments are contemplated within the scope of the invention in addition to the exemplary embodiments shown and described herein. Modifications and substitutions by one of ordinary skill in the art are considered to be within the scope of the invention, which is not to be limited except by the following claims.

What is claimed is:

1. A method of affixing a radio frequency identification (RFID) label to an item comprising:

at a pre-programming station, partially pre-programming a supply of RFID labels each comprising a plurality of programmable bits, the labels removably affixed to a web of material wound on a supply roll, the pre-programming station being in communication with an integrated programmer/label applicator apparatus, the pre-programming station being different from the integrated programmer/label applicator apparatus, wherein the step of partially pre-programming the labels comprises:

programming a first portion of said programmable bits with data that is common to each of a plurality of items to receive a label;

detecting defective labels by reading the pre-programmed labels to determine if at least the first portion of programmable bits were properly programmed;

identifying the location of a defective label relative to its position on the web and the pre-programming station; and sending a signal to the integrated RFID programmer/label applicator apparatus indicating the position of the defective label on the web; and drawing the pre-programmed RFID labels from the pre-programming station into the integrated RFID programmer/label applicator apparatus from the continuous roll supply, the integrated RFID programmer/label applicator determining whether a signal was received from the pre-programming station indicating that a pre-programmed label at a specified location on the web was defective; and when the signal did not indicate that the label was defective, the integrated RFID programmer/label apparatus performing the steps of:

programming item-specific data into a second portion of the programmable bits of the label to provide an item-specific label;

removing said item-specific label from the web; and applying said item-specific label to an associated item.

2. A method according to claim 1, said method further comprising verifying that said partially pre-programmed labels are partially pre-programmed prior to said drawing said pre-programmed labels from said label supply.

3. A method according to claim 2, wherein said verifying comprises reading said partially pre-programmed labels.

4. A system for affixing a radio frequency identification (RFID) label to an item comprising:

a roll supply of RFID labels removably affixed to a web of material, the labels comprising a plurality of programmable bits;

a pre-programming station for partially pre-programming the RFID labels on the roll supply, the pre-programming station programming a first portion of the programmable bits with data that is common to each of a plurality of items to receive a label; and an integrated RFID label programmer/applicator apparatus in communication with the pre-programming station, the pre-programming station being different from the integrated RFID label programmer/applicator apparatus, the integrated RFID label programmer applicator apparatus drawing the roll supply of RFID labels from the pre-programming station, the integrated RFID label programmer/applicator apparatus programming item-specific data into a second portion of the programmable bits of the label to provide an item specific label, the integrated RFID label programmer applicator including a peeler member for removing the item-specific label and a tamp member for applying the label to an item, wherein the apparatus removes the item specific label from the web and affixes the label to an associated item.

5. A system according to claim 4, wherein the pre-programming station is operable to detect defective labels by reading the pre-programmed labels to determine if at least the first portion of programmable bits were properly programmed.

6. A system according to claim 5, wherein the pre-programming station is operable to identify the position of a defective label and send a signal to the integrated RFID programmer/label applicator apparatus indicating the position of the defective labels on the web.

7. A system according to claim 4, wherein said system is configured to advance said labels from said label supply past said pre-programming station and then to said integrated RFID label programmer/applicator.

8. A system according to claim 6, wherein the integrated RFID programmer/label applicator apparatus includes a label reject assembly, and the apparatus is operable upon receiving a signal indicating that a label is defective to remove the defect label from the web and affix it to a surface that is not a part of an item prior to programming the second portion of bits.

9. A system according to claim 8, wherein the label reject assembly including a tamp pad, and an accumulation pad coupled to a label reject driving assembly, the label reject driving assembly configured to drive the accumulation pad between the tamp pad and the item such that the tamp pad applies the defective label to the accumulation pad in lieu of the item.

10. A system according to claim 4, wherein said pre-programming system is configured to verify that said partially pre-programmed labels are programmed with said common data.

11. A method according to claim 1, further comprising, after programming item-specific data into said partially pre-programmed label, determining whether the item-specific data bits are defective without determining whether the common data bits are defective.

12. A system according to claim 4, the programming unit configured to, after programming item specific data on said label, determine whether the item specific data on said label is defective without determining whether the common data on said label is defective.

* * * * *